United States Patent
Hsu et al.

(10) Patent No.: US 7,277,455 B2
(45) Date of Patent: Oct. 2, 2007

(54) PACKET FLOW PROCESSING IN A COMMUNICATION SYSTEM

(75) Inventors: Raymond T. Hsu, San Diego, CA (US); Jun Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 10/170,059

(22) Filed: Jun. 10, 2002

(65) Prior Publication Data
US 2003/0227871 A1    Dec. 11, 2003

(51) Int. Cl.
*H04J 3/16* (2006.01)
*H04J 3/22* (2006.01)

(52) U.S. Cl. ..................... 370/468; 370/338

(58) Field of Classification Search .............. 370/229, 370/230, 230.1, 231, 235, 236, 465, 466, 370/468, 338, 349, 395.2, 400, 410, 351–356
See application file for complete search history.

(56) References Cited

U.S. PATENT DOCUMENTS

| | | | |
|---|---|---|---|
| 6,084,855 A | * | 7/2000 | Soirinsuo et al. ........... 370/235 |
| 6,252,857 B1 | * | 6/2001 | Fendick et al. ............. 370/254 |
| 2001/0027490 A1 | * | 10/2001 | Fodor et al. ................ 709/238 |
| 2002/0032800 A1 | * | 3/2002 | Puuskari et al. ............ 709/246 |
| 2002/0126701 A1 | * | 9/2002 | Requena ..................... 370/469 |
| 2003/0035401 A1 | * | 2/2003 | Shaheen et al. ............. 370/341 |
| 2003/0081592 A1 | * | 5/2003 | Krishnarajah et al. ....... 370/352 |
| 2004/0047366 A1 | * | 3/2004 | Chowdhury ................. 370/466 |

OTHER PUBLICATIONS

Davie, B. et al., "Integrated Services in the Presence of Compressible Flows," RFC 3006, Nov. 2000.

* cited by examiner

*Primary Examiner*—Ajit Patel
(74) *Attorney, Agent, or Firm*—Kam T. Tam; Sandra L. Godsey; Thomas R. Rouse

(57) ABSTRACT

Method and apparatus for processing packet flows in a communication system. In one embodiment, a resource reservation message includes packet flow parameter information used to determine flow treatment of the associated packet flow. The packet flow mapping is based on the quality of service of the associated packet flow. In another embodiment, a bearer connection is established and monitored for information relating to flow treatment.

8 Claims, 5 Drawing Sheets

PACKET FLOW PROCESSING IN A COMMUNICATION SYSTEM

BACKGROUND

1. Field

The present invention relates to packet flow processing in a communication system, and more specifically to packet flow mapping and treatment to support multiple service instances in a communication system having an Internet Protocol (IP) component.

2. Background

Communication systems supporting data communications often include an Internet Protocol (IP) component or portion, wherein data is communicated in an IP format. Similarly, a communication system may be in communication with an IP system, or may participate in a communication with an IP node. For such communications, data is transported in packets; a sequence of packets is referred to as a "packet flow." In order to process the packet flow, the infrastructure element(s) of a communication system require certain information. For example, the infrastructure element(s) may need header compression and/or mapping information so that the infrastructure element(s) can direct the packet flows to appropriate link-layer connections.

There is therefore a need in the art to provide packet flow information to the infrastructure elements requiring such information. Similarly, there is a need for an efficient method for mapping and treatment of packet flows in a communication system.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
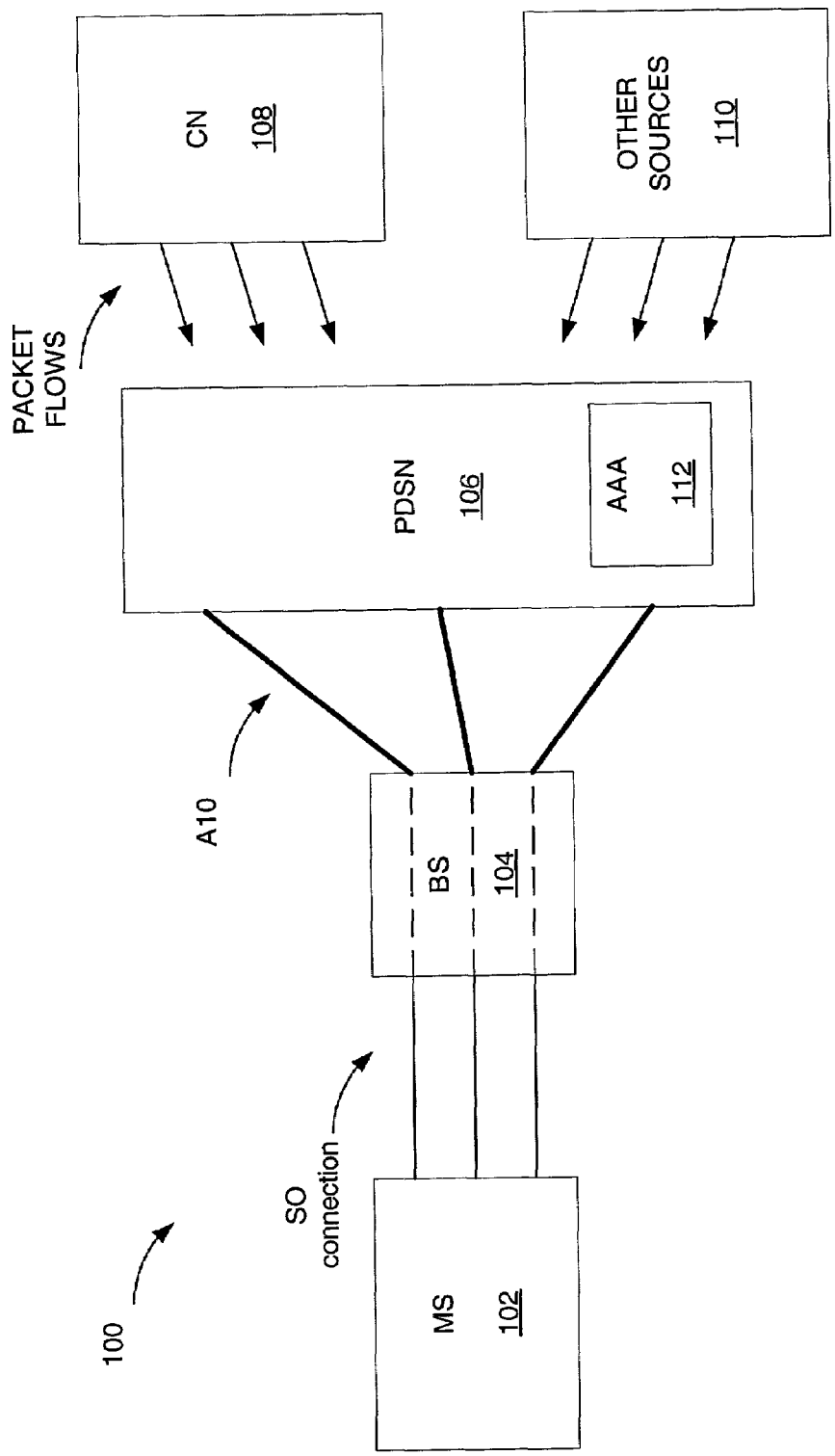
FIG. 1 is a communication system.

FIG. 1 is a communication system 100 adapted for data communications. The communication system 100 includes a Mobile Station (MS) 102 in communication with a Base Station (BS) 104. The BS 104 is further in communication with a Packet Data Service Node (PDSN) 106, as well as with other components for processing voice communications, etc. (not shown). The PDSN 106 serves as an interface for the MS 102 and the BS 104 with data networks, such as networks supporting IP communications.

The MS 102 supports data communications, wherein several A10 connections and Service Option (SO) connections are illustrated. A SO connection is used for communication of a selected Service Option, such as packet data services. An A10 connection then provides a link for sending Internet Protocol (IP) packets between the PDSN 106 and BS 104. The SO connection provides a link for sending IP packets between the MS 102 and BS 104. There is a one-to-one mapping between the SO connection (MS-BS) and A10 connection (BS-PDSN). Multiple A10/SO connection pairs are illustrated in FIG. 1, as the MS 102 supports multiple simultaneous connections. In other words, the MS 102 is able to process multiple packet flows in parallel. Each packet flow is assigned to an A10 connection or link. The assignment of a packet flow to an A10 link is referred to as packet flow "mapping" and is determined by the PDSN. There are a variety of criteria and algorithms for such mapping that are applicable in the system 100 of FIG. 1.

As discussed hereinabove, each SO connection or link between the MS 102 and BS 104 has a corresponding A10 connection or link between the BS 104 and the PDSN 106. The correspondence is illustrated by the dashed lines through BS 104. SO/A10 connections may be used for a bi-directional or interactive communication, such as a Voice over IP (VoIP) communication, or may be used for a unidirectional communication, such as to download data or for the streaming of information from an Internet source. As the number of type of data communications increases, SO/A10 connections may be implemented for more and more of these communications. Note that multiple SO connections (a.k.a. service instances) are needed to support different QoS requirements of packet flows. For example, the MS 102 may have two active SO connections. The first SO connection having retransmission mechanisms to provide reliable transport over the air at the cost of transmission latency, and, therefore, is used for transporting data that requires reliable transmission. The second SO connection may not have retransmission mechanisms and is used for transporting data that requires expedited transmission.

The PDSN 106 further includes the Authentication Accounting and Authorization (AAA) 112. The AAA 112 serves to authenticate connections and keep track of the accounting for billing, etc. by the carrier or service provider. The PDSN 106 receives packet flows from a Corresponding Node (CN) 108 as well as from other sources 110. The CN 108 may be a node on the Internet, a service provider, a terminal, etc. In other words, the CN 108 is a source of information or a participant to a communication. Note that the PDSN 106 may receive multiple packet flows from multiple sources, wherein said packet flows are destined for multiple participants, such as MS 102. Each packet flow is mapped to a corresponding SO/A10 connection and is processed according to the parameters negotiated by the participants.

The flow mapping and treatment of each packet flow is particularly important when multiple service instances are set up to a given user, such as MS 102. If the MS 102 has multiple active service instances and the MS 102 uses multiple header compression algorithms, the PDSN 106 will desire information for processing the packet flows associated with each service instance. Information includes, but is not limited to, the specific header compression algorithms used for each packet flow, and the mapping of each packet flow to each A10 connection.

The embodiment described herein below is one method that provides flow treatment information via an RSVP message that contains a new object called the flow treatment. The RSVP message is a resource reservation setup protocol designed for integrated services on the Internet, and is described in RFC 2205 entitled "Resource ReSerVation Protocol (RSVP)" by R. Branden, et al. The RSVP protocol is used by a host to request specific qualities of service from the network for particular application data streams or flows. RSVP is also used by routers to deliver Quality-of-Service (QoS) requests to all nodes along the path(s) of the flows and to establish and maintain state to provide the requested service. RSVP requests will generally result in resources being reserved in each node along the data path. The RSVP message provides packet filters for bi-directional packet flows (e.g., interactive VoIP session) or uni-directional packet flows (e.g., streaming session). Packet filters are used by a node to recognize a particular packet flow.

RSVP defines a "session" to be a data flow with a particular destination and transport-layer protocol. RSVP treats each session independently. An RSVP session is defined by the triple: (DestAddress, ProtocolId [DstPort]). Here DestAddress, the IP destination address of the data packets, may be a unicast or multicast address. ProtocolId is the IP protocol ID. The optional DstPort parameter is a "generalized destination port", i.e., some further demultiplexing point in the transport or application protocol layer. DstPort could be defined by a UDP/TCP destination port field, by an equivalent field in another transport protocol, or by some application-specific information.

Figure 4:
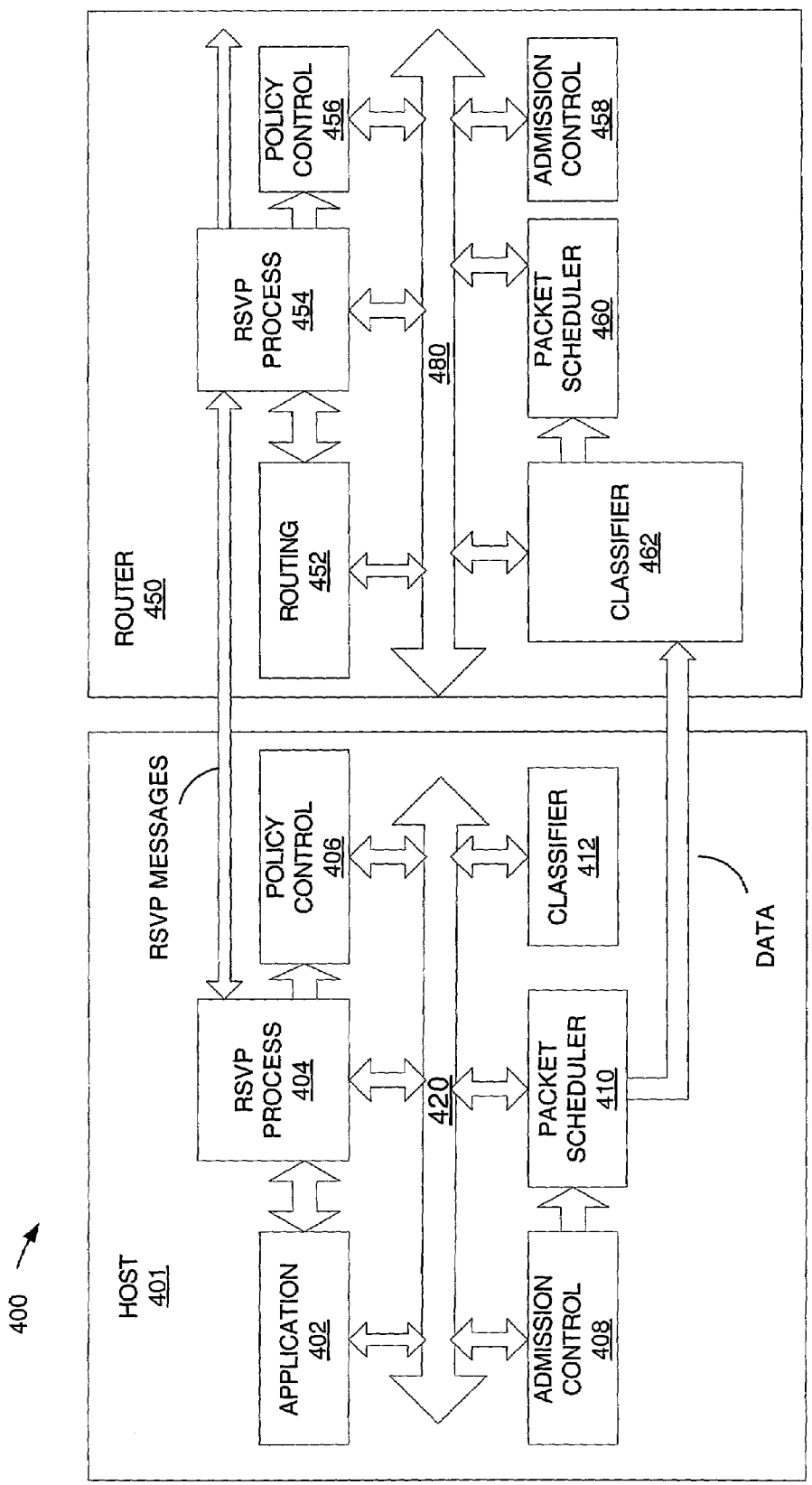
FIG. 4 illustrates a communication system supporting Resource Reservation Protocol.

Upon establishment of a main service instance, when the MS 102 decides to setup an auxiliary service instance, the MS 102 sends an RSVP PATH and RESV Messages to request Quality of Service (QoS) resources. In the RSVP RESV Message, the MS 102 will characterize the packet flow via IP addresses and port numbers and conveys the codec type and header compression type. Upon receiving the RSVP RESV Message, the PDSN will examine the information and request a new A10 connection to BS and associate the newly-established A10 connection with the packet flow characterized by the Filter Spec and optionally the Session Class (defined hereinbelow with respect to the RSVP type protocols). FIG. 4 details the format of an RSVP message consistent with RFC 2205. The RSVP message is illustrated as an example of a message that may be used for transmission of the information needed by the PDSN for packet flow treatment and/or mapping. Alternate embodiments may implement other messages to provide the same or similar information.

Note that throughout the discussion of RSVP type protocols, directional terms are defined according to the direction of the flow of data. RSVP messages carrying reservation requests originate at receivers and are passed upstream towards the sender(s). Specifically, the directional terms "upstream" vs. "downstream", "previous hop" vs. "next hop", and "incoming interface" vs. "outgoing interface" are defined with respect to the direction of data flow.

FIG. 4 illustrates a communication system having a host 401 and a router 450 implementing the RSVP protocol. As illustrated, the host 401 includes an application unit 402 bidirectionally coupled to an RSVP process unit 404. The RSVP process unit 404 determines the appropriate RSVP message and content for transmission and also considers those RSVP messages and content received from the router 450. The RSVP process unit 404 is coupled to a policy control unit 406. Communication within the host 401 is via a communication bus 420. The host 401 further includes an admission control unit 408, a packet scheduler 410, and a classifier 412.

Continuing with FIG. 4, the router 450 includes similar units as in the host 401, however the configuration may be implemented in a slightly different manner. The router 450 includes routing unit 452, RSVP process unit 454, policy control unit 456, admission control unit 458, packet scheduler 460, classifier 462, all in communication via communication bus 480. Note that RSVP process unit 404 communicates RSVP messages to and from RSVP process unit 454.

Within system 400, Quality of service is implemented for a particular data flow by mechanisms collectively called "traffic control". These mechanisms include (1) a packet classifier (classifier 412, 462), (2) admission control (admission control 408, 458), and (3) a "packet scheduler" (packet scheduler 410, 460) or some other link-layer-dependent mechanism to determine when particular packets are forwarded. The "packet classifier" mechanism or classifier 412, 462 determines the QoS class (and perhaps the route) for each packet. For each outgoing interface, the "packet scheduler" or other link-layer-dependent mechanism achieves the promised QoS. Traffic control implements QoS service models defined by the Integrated During reservation setup, an RSVP QoS request is passed to two local decision modules, "admission control" (admission control 408, 458) and "policy control" (406, 456). Admission control 408, 458 determines whether the node has sufficient available resources to supply the requested QoS. Policy control (406, 456) determines whether the user has administrative permission to make the reservation. If both checks succeed, parameters are set in the packet classifier and in the link layer interface (e.g., in the packet scheduler) to obtain the desired QoS. If either check fails, the RSVP program returns an error notification to the application process that originated the request.

RSVP protocol mechanisms provide a general facility for creating and maintaining distributed reservation state across a mesh of multicast or unicast delivery paths. RSVP itself transfers and manipulates QoS and policy control parameters as opaque data, passing them to the appropriate traffic control and policy control modules for interpretation. Since the membership of a large multicast group and the resulting multicast tree topology are likely to change with time, the RSVP design assumes that state for RSVP and traffic control state is to be built and destroyed incrementally in routers and hosts. For this purpose, RSVP establishes "soft" state; that is, RSVP sends periodic refresh messages to maintain the state along the reserved path(s). In the absence of refresh messages, the state automatically times out and is deleted. In summary, RSVP has the following attributes:

1. RSVP makes resource reservations for both unicast and many-to-many multicast applications, adapting dynamically to changing group membership as well as to changing routes.
2. RSVP is simplex, i.e., supports reservations for unidirectional data flows.
3. RSVP is receiver-oriented, i.e., the receiver of a data flow initiates and maintains the resource reservation used for that flow.
4. RSVP maintains "soft" state in routers and hosts, providing graceful support for dynamic membership changes and automatic adaptation to routing changes.
5. RSVP is not a routing protocol but supports present and future routing protocols.
6. RSVP transports and maintains traffic control and policy control parameters that are opaque to RSVP.
7. RSVP provides several reservation models to fit a variety of applications.
8. RSVP provides transparent operation through routers that do not support RSVP.
9. RSVP supports both IPv4 and IPv6.

An elementary RSVP reservation request consists of a "flowspec" together with a "filter spec"; the pair is called a "flow descriptor". The flowspec specifies a desired QoS. The filter spec, together with a session specification, defines the set of data packets—the "flow"—to receive the QoS defined by the flowspec. The flowspec is used to set parameters in the node's packet scheduler or other link layer mechanism, while the filter spec is used to set parameters in the packet classifier. Data packets that are addressed to a particular session but do not match any of the filter specs for that session are handled as best-effort traffic.

The flowspec in a reservation request will generally include a service class and two sets of numeric parameters: (1) an "Rspec" (R for 'reserve') that defines the desired QoS, and (2) a "Tspec" (T for 'traffic') that describes the data flow. The formats and contents of Tspecs and Rspecs are determined by the system and are generally opaque to RSVP.

The exact format of a filter spec depends upon which IP version is in use. Current versions consider IPv4 or IPv6. According to one approach, filter specs may select arbitrary subsets of the packets in a given session. Such subsets might be defined in terms of senders (i.e., sender IP address and generalized source port), in terms of a higher-level protocol, or generally in terms of any fields in any protocol headers in the packet. For example, filter specs might be used to select different subflows of a hierarchically-encoded video stream by selecting on fields in an application-layer header. In the interest of simplicity (and to minimize layer violation), the basic filter spec format defined in the current RSVP specification has a very restricted form: sender IP address and optionally the UDP/TCP port number SrcPort.

At each intermediate node, a reservation request triggers two general actions, as follows:

1. Make a Reservation on a Link:

The RSVP process passes the request to admission control and policy control. If either test fails, the reservation is rejected and the RSVP process returns an error message to the appropriate receiver(s). If both succeed, the node sets the packet classifier to select the data packets defined by the filter spec, and it interacts with the appropriate link layer to obtain the desired QoS defined by the flowspec.

The detailed rules for satisfying an RSVP QoS request depend upon the particular link layer technology in use on each interface. For a simple leased line, the desired QoS will be obtained from the packet scheduler in the link layer driver, for example. If the link-layer technology implements its own QoS management capability, then RSVP negotiates with the link layer to obtain the requested QoS. Note that the action to control QoS occurs at the place where the data enters the link-layer medium, i.e., at the upstream end of the logical or physical link, although an RSVP reservation request originates from receiver(s) downstream.

2. Forward the Request Upstream:

A reservation request is propagated upstream towards the appropriate senders. The set of sender hosts to which a given reservation request is propagated is called the "scope" of that request.

The reservation request that a node forwards upstream may differ from the request that it received from downstream, for two reasons. The traffic control mechanism may modify the flowspec hop-by-hop. More importantly, reservations from different downstream branches of the multicast tree(s) from the same sender (or set of senders) must be "merged" as reservations travel upstream.

When a receiver originates a reservation request, it can also request a confirmation message to indicate that its request was (probably) installed in the network. A successful reservation request propagates upstream along the multicast tree until it reaches a point where an existing reservation is equal or greater than that being requested. At that point, the arriving request is merged with the reservation in place and need not be forwarded further; the node may then send a reservation confirmation message back to the receiver.

There are two fundamental RSVP message types: RESV and PATH. Each receiver host sends RSVP reservation request (RESV) messages upstream towards the senders. These messages must follow exactly the reverse of the path(s) the data packets will use, upstream to all the sender hosts included in the sender selection. The RESV message results in creation and maintenance of a "reservation state" in each node along the path(s). RESV messages are finally delivered to the sender hosts themselves, so that the hosts can set up appropriate traffic control parameters for the first hop along the path.

Each RSVP sender host transmits RSVP "PATH" messages downstream along the uni-/multicast routes provided by the routing protocol(s), following the paths of the data. These RSVP PATH messages store a "path state" in each node along the way. This path state includes at least the unicast IP address of the previous hop node, which is used to route the RESV messages hop-by-hop in the reverse direction. Note that future designs may implement routing protocols that supply reverse path forwarding information directly, replacing the reverse-routing function of path state.

A PATH message contains the following information in addition to the previous hop address:

1. Sender Template

A PATH message is required to carry a Sender Template, which describes the format of data packets that the sender will originate. This template is in the form of a filter spec that could be used to select this sender's packets from others in the same session on the same link. Sender Templates have exactly the same expressive power and format as filter specs that appear in Resv messages. Therefore a Sender Template may specify only the sender IP address and optionally the UDP/TCP sender port, and assuming the protocol Id specified for the session.

2. Sender Tspec

A PATH message is required to carry a Sender Tspec, which defines the traffic characteristics of the data flow that the sender will generate. This Tspec is used by traffic control to prevent over-reservation, and perhaps unnecessary Admission Control failures.

3. Adspec

A Path message may carry a package of OPWA advertising information, known as an "Adspec". An Adspec received in a PATH message is passed to the local traffic control, which returns an updated Adspec; the updated version is then forwarded in PATH messages sent downstream. PATH messages are sent with the same source and destination addresses as the data, so that they will be routed correctly through non-RSVP cloud. On the other hand, RESV messages are sent hop-by-hop; each RSVP-speaking node forwards a RESV message to the unicast address of a previous RSVP hop.

Figure 2:
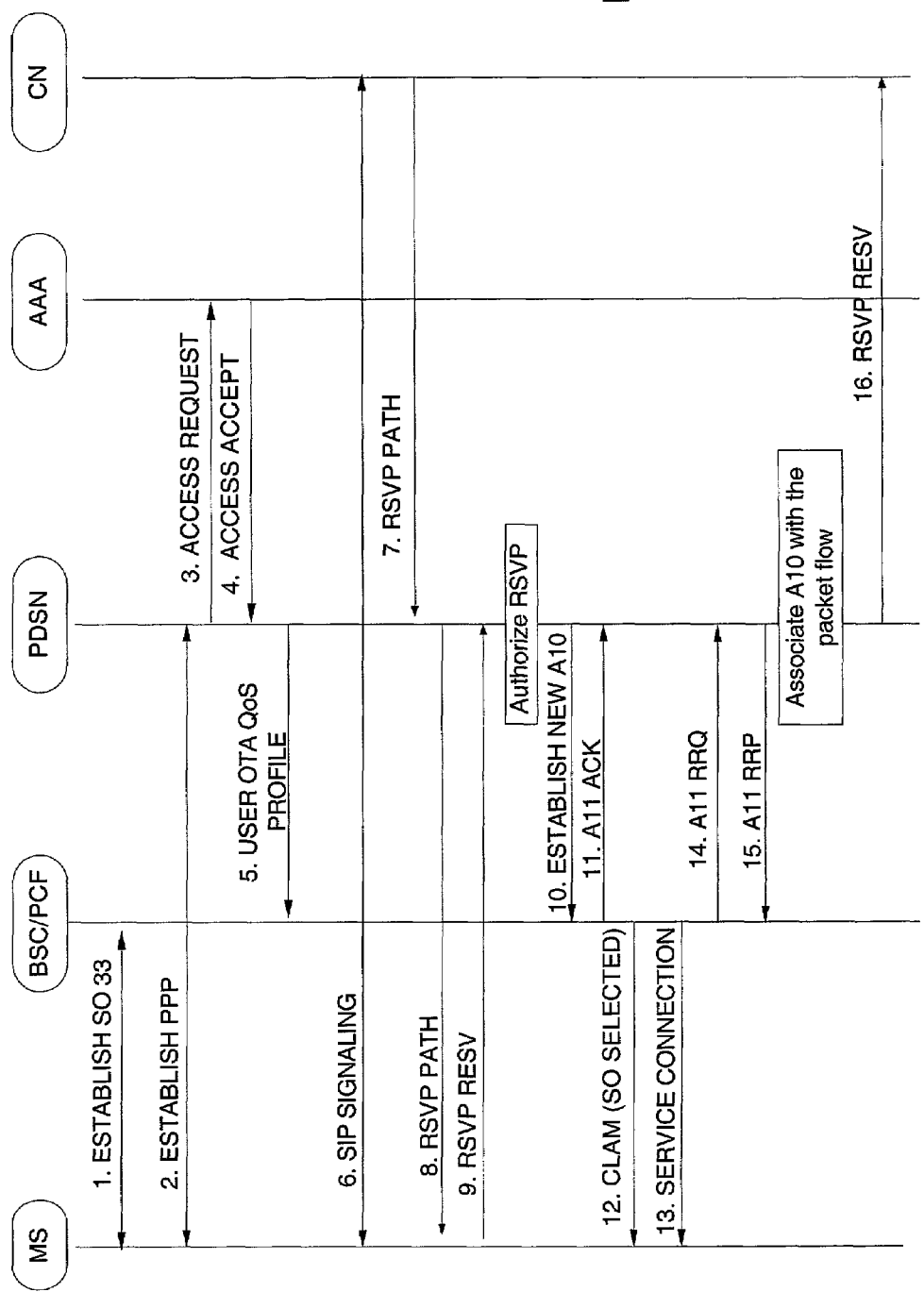
FIG. 2 is a call flow for a processing wherein a PDSN determines the flow treatment and the mapping for a packet flow from RSVP message(s).

FIG. 2 illustrates bi-directional, interactive call processing between a MS 102, BS 104 (which includes Packet Control Function (PCF) operations), PDSN 106, AAA 108, and CN 110. The flow is described chronologically in steps labeled (in FIG. 2) from 1 to 16.

At a step 1, before the mobile can send Session Initiation Protocol (SIP) signaling triggered by applications, the MS establishes a Service Option (SO), such as for packet data services SO 33. In the example illustrated, the Radio Link Protocol (RLP) retransmissions enabled. This provides a mechanism for the SIP messages to be transported reliably over the air. Note that SIP is detailed in "SIP: Session Initiation Protocol" by J. Rosenberg, et al., published by the Internet Engineering Task Force having document no. draft-ietf-sip-rfc2543bis-08.ps, dated Feb. 21, 2002; and also in "SIP: Session Initiation Protocol" by M. Handley et al., published by the Network Working Group having document no. RFC 2543, dated March 1999.

The Session Initiation Protocol (SIP) is an application-layer control (signaling) protocol for creating, modifying, and terminating sessions with one or more participants. These sessions include Internet telephone calls, multimedia distribution, and multimedia conferences. SIP invitations used to create sessions carry session descriptions that allow participants to agree on a set of compatible media types. SIP makes use of elements called proxy servers to help route requests to the user's current location, authenticate and authorize users for services, implement provider call-routing policies, and provide features to users. SIP also provides a registration function that allows users to upload their current locations for use by proxy servers. SIP runs on top of several different transport protocols.

At step 2, the MS establishes a Point-to-Point (PPP) session with PDSN. This provides the bearer connection for the link layer, allowing establishment of connections for packet flows. Note that PPP is detailed in "The Point-to-Point Protocol (PPP)" by W. Simpson, published by Network Working Group as RFC 1661, dated July 1994.

At step 3, the PDSN sends an Access Request to the AAA containing the MS Network Access Identifier (NAI) and a credential. The NAI is a unique identifier for the MS. The credential is an authenticator computed by the MS in response to a Challenge Handshake Authentication Protocol. (CHAP) (if Simple IP is used) or a Foreign Agent Challenge (if Mobile IP is used).

At step 4, if the mobile is authenticated successfully, the AAA sends an Access Accept containing the user subscription profile. The profile consists of two parts: an Over The Air (OTA) component; and an IP component.

At step 5, the PDSN receives and caches the user IP subscription profile and forwards the user OTA subscription profile to the BS At step 6, the mobile sends SIP signaling via PPP/SO33. The SIP signaling serves to set up a virtual bearer connection with the CN. This is an IP bearer connection through which the packet flow will be transported. At step 7, triggered by the SIP signaling (e.g., 183 Session Progress), the CN sends an RSVP PATH message toward the MS. In the RSVP Path Message, the CN includes the standard RSVP objects Sender Template and Sender Traffic Spec (Tspec), that characterizes the packet flow that will be generated by the CN. At step 8, the PDSN forwards the RSVP PATH message to the MS. At step 9, upon receiving the RSVP PATH message, the MS uses the information contained in the message to calculate the desired QoS parameters (i.e., bandwidth and delay) for receiving the packet flow. The mobile then sends an RSVP RESV message to reserve resource along the path to the CN. The RSVP RESV message contains the flowspec, filter spec, and the treatment spec, which is a new RSVP object specific to systems supporting the standard offered by a consortium named "3rd Generation Partnership Project 2" referred to herein as 3GPP2, and TR-45.5 referred to herein as the cdma2000 standard.

The flowspec specifies a desired QoS. The flowspec is used to set parameters in the node's packet scheduler or other link layer mechanism. The flowspec in a reservation request will generally include a service class and two sets of numeric parameters: (1) an "Rspec" (R for 'reserve') that defines the desired QoS, and (2) a "Tspec" (T for 'traffic') that describes the data flow. The formats and contents of Tspecs and Rspecs are determined by the integrated service models and are generally opaque to RSVP.

The filter spec defines the packet filters for the packet flow whose QoS is defined by the flowspec. The filter spec is used to set parameters in the packet classifier. Data packets that are addressed to a particular session but do not match any of the filter specs for that session are handled as best-effort traffic.

The treatment spec, which is a new RSVP object, conveys the header compression type that should be used on the packet flow.

Upon receiving the RSVP RESV message, the PDSN performs authorization based on the PDSN loading and local policy, mobile reachability, and user's IP subscription profile. If the PDSN rejects the RSVP RESV message, the PDSN sends an RSVPTear message toward the CN and a PATHTear message toward the MS. Else if the RSVP RESV is authorized, the PDSN examines the treatment spec of the RSVP RESV message. The treatment spec contains the header compression type that the MS wants to use on the packet flow. The PDSN determines whether or not a new A10 connection is needed. If needed, the PDSN sends an A11 Registration Update (RUP) Message to BS to request for a new A10 connection in step 10.

For example: If the header compression type is LLAROHC, the PDSN provides notification, via A11, to the BS to establish a new A10 connection and initiate the establishment of the selected service option instance, such as SO 61, with the MS.

If the header compression type is ROHC, the PDSN sends notification, via A11, to the BS to establish a new A10 connection and initiate the establishment of auxiliary service option instance, such as SO 33, (without RLP retransmissions) with the MS.

The association between header compression type and SO can be done in PDSN or BS. If the association is done in the PDSN, then the A11 RUP message will contain the SO number, and the BS uses it to initiate the service negotiation with the MS. If the association is done in the BS, then the A11 RUP message will contain the header compression type, and the BS will associate it with a SO number and uses it to initiate the service negotiation with the MS.

At step 11, the BS responds with A11 Registration Acknowledgement (RACK) Message. At step 12, the BS attempts to connect the SO specified in A11 signaling message to the MS via Call Assignment Message (CLAM). At step 13, the BS connects the SO selected. At step 14, the BS sends an A11 RRQ to establish an A10 connection. At step 15, the PDSN responds with an A11 RRP.

At step 16, upon successful establishment of the new A10 connection, the PDSN associates the newly established A10 connection with the packet filters obtained from the filter spec of the RSVP RESV message in art step 9. This allows the PDSN to perform flow mapping on the packet flow that fits the description of the packet filters. The PDSN removes the treatment spec from the RSVP RESV message and sends it toward the CN. If for some reason(s) the new A10 connection is not established after a timeout, the PDSN sends PATHTear message toward the MS.

From this point the packet flow is processed from the CN to the MS via the PDSN. The PDSN performs the appropriate header compression on the packet flow and foward the packet flow to the appropriate A10 connection.

Note that FIG. 2 illustrates an unidirectional communication from the CN to MS. For interactive bi-directional communication between the CN and MS, both the MS and the CN are sources and destinations. Therefore, in addition to the steps illustrated in FIG. 2 and detailed hereinabove, symmetrical steps are initiated from the MS. For example, the MS also sends an RSVP Path message. Similarly, the PDSN forwards the RSVP Path message to the CN. The CN provides an RSVP RESV message; and the PDSN forwards the RSVP RESV message to the MS. The RSVP RESV message from the CN will not necessarily trigger the PDSN to request A10 connection establishment as in step 10.

For the situation of an existing A10 connection for an auxiliary SO 33 with no RLP retransmission enabled, one embodiment utilizes the existing connection. According to an alternate embodiment, the BS establishes another auxiliary SO 33 with the MS. In this case, if the MS refuses, then the existing auxiliary SO 33 is used to also transport the new codec.

FIG. 2 illustrates call flow in a spread-spectrum communication system adapted for IP communications, and capable of processing packet flows. Alternate communication systems may be employed to provide the information necessary for processing a packet flow. Such information is not limited to the specific information detailed in the example, but may include any information needed or desired by the system components. Similarly, the order of steps may be altered according to the design and needs of a given system. The call flow of FIG. 2 is provided as examples of packet flow processing.

The embodiment described herein below is another method that provides flow treatment and flow mapping information via an RSVP message. The flow treatment and mapping information can be derived from the standard RSVP objects conveyed in the RSVP RESV message, and no new RSVP object needs to be defined as in the previous method.

The call flow is the same as in FIG. 2. One difference is that in step 9, the RSVP RESV message only contains the flowspec and filter spec. There is no treatment spec that explicitly tells the PDSN what header compression type should be used on the packet flow. Instead, the PDSN uses the flowspec to determine the header compression type implicitly.

The flowspec includes the Reservation Spec (Rspec) and Traffic Spec (Tspec). The Rspec describes the service rate, and the Tspec describes the token bucket parameters (bucket rate, peak rate, bucket dept, maximum packet size) to characterize the traffic that the CN will generate. The Rspec and Tspec together characterize a CDMA voice codec (e.g., 13-kbps PureVoice, 8-kbps EVRC, 8-kbps SMV, or 4-kbps SMV) that outputs a voice frame every 20 ms. The PDSN is configured to recognize CDMA voice codec based on the parameter values in the flowspec. If there is a match, and the MS is capable of LLAROHC, the PDSN requests the BS to establish a new A10 connection, and the BS establishes SO 61 with the MS. If there is no match, then the PDSN concludes that the packet flow carries a real time codec other than CDMA voice codecs; in this case, if the MS is capable of ROHC and currently has no auxiliary SO 33, then the PDSN requests the BS to establish a new A10 connection, and the BS establishes an auxiliary SO 33 (RLP retransmission disabled) with the MS.

It is possible that a different codec might have the same Rspec and Tspec description as a CDMA codec. For example, codec X is characterized as service rate 8 kbps, 20-ms constant inter-packet interval, and maximum packet size of 171 bits plus header overhead, which is same as the EVRC characterization. This contribution recommends that 0-byte header compression is applied to the packet flow carrying codec X, as if it was EVRC. Although the lower-rate frame sizes of codec X might be different from that of EVRC, each lower-rate frame can be padded and fitted into a CDMA physical-layer frame (full, ½, ¼, or ⅛).

Figure 3:
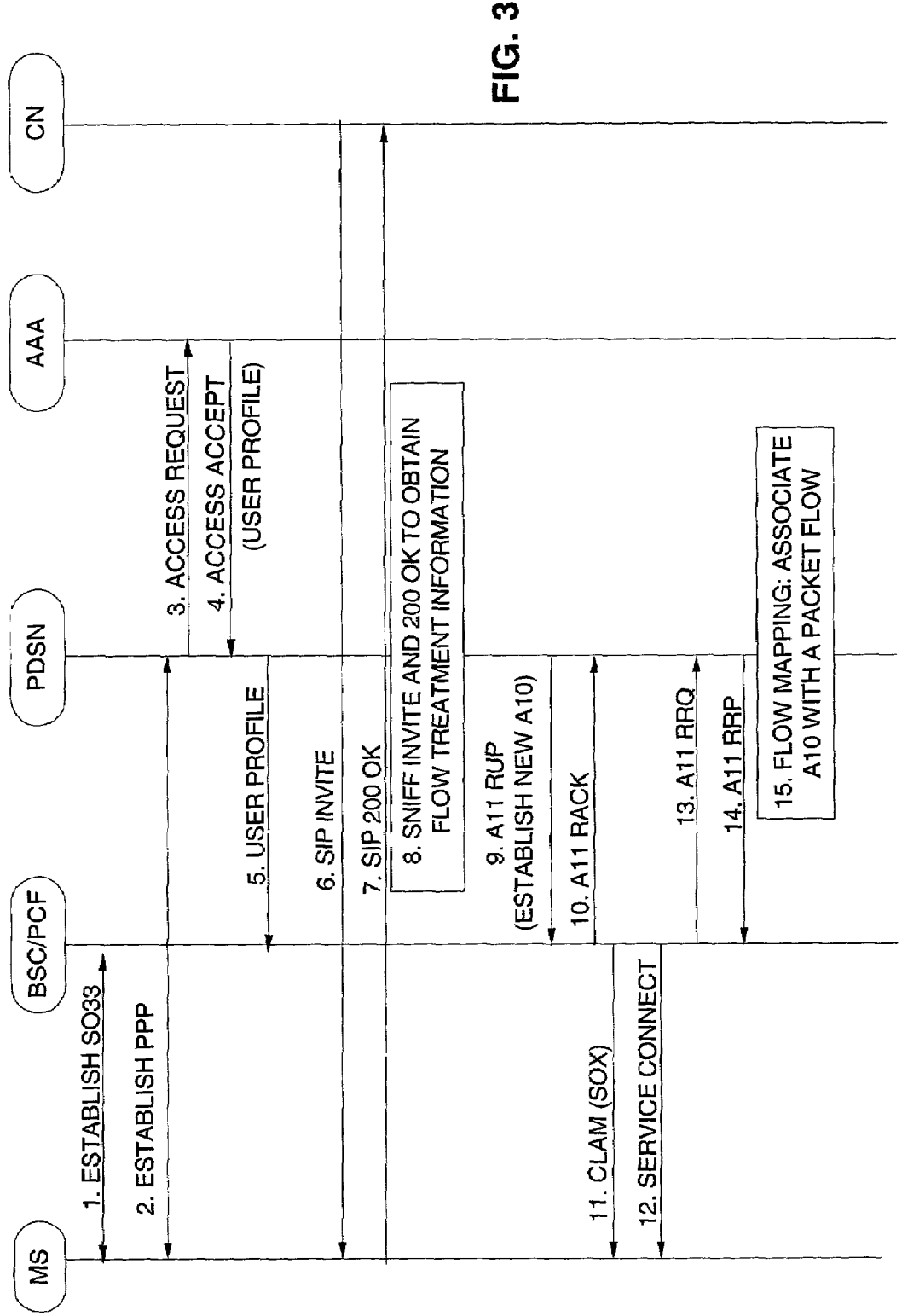
FIG. 3 is a call flow for a processing wherein a PDSN determines the flow treatment and the mapping from "sniffing" Session Initiation Protocol (SIP) messages.

FIG. 3 illustrates the call flow processing wherein the PDSN determines flow treatment and/or mapping from "sniffing" SIP messages. Sniffing refers to a process of examining messages looking for specific information. Typically, a node will sniff for specific information while ignoring all other information. In the embodiment illustrated in FIG. 3, the PDSN sniffs for the specific information desired to determine treatment of a given packet flow and/or for mapping of a given packet flow. The PDSN sniffs the SIP signaling messages. The PDSN ignores other content of the SIP message. Alternate embodiments may apply other content in the SIP message for such processing or for other operation of the PDSN.

The embodiment illustrated in FIG. 3 provides an alternate method to determine flow treatment and flow mapping information, wherein such determination is based on the PDSN sniffing Session Initiation Protocol (SIP) messages. This method relies on the PDSN to sniff SIP messages to determine the IP addresses, port numbers, and codec of a new packet flow that will be generated by the CN. This provides sufficient information for the PDSN to determine flow treatment and flow mapping. The PDSN also determines whether or not a new A10 connection is needed to transport the packet flow. If needed, the PDSN requests the BS to establish the A10 connection, and the BS initiates the establishment of a new service instance with the MS.

Sniffing SIP messages requires the PDSN to recognize that an IP packet is carrying a SIP message and pick out the essential information from the SIP message. The PDSN examines the destination port number of a packet. If it is equal to 5060, then the transport payload is carrying a SIP message. Note that there are many SIP messages and fields. The PDSN pays attention to the SIP INVITE and SIP 200 OK messages and may choose to ignore the other SIP messages. Note that SIP defines a variety of messages. The SIP INVITE message indicates that a user or service is being invited to participate in a session. An SIP 200 OK message indicates that a request has succeeded. Within the SIP INVITE and SIP 200 OK messages, the PDSN pays attention to the connection field that conveys the IP address information, the media field that conveys the port number information, and the attribute field that conveys the codec type. Based on the codec type, the PDSN determines which header compression type should be used on the packet flow. For example, if the codec type indicates a CDMA codec (e.g., PureVoice, EVRC, or SMV), Link-Layer-Assisted Robust Header Compression (LLAROHC) will be used; if the codec type indicates a codec other than a CDMA codec, Robust Header Compression (ROHC) will be used. Alternate systems may support any of a number of codec types, and the specific details provided herein serve as an example.

After the PDSN determines the header compression type, the PDSN determines whether or not a new A10 connection is needed for the new packet flow. If needed, the PDSN requests the BS to establish the A10 connection, and the BS initiates the establishment of a new service instance with the MS. Upon successful establishment of the A10 connection, the PDSN associates the A10 connection with the packet filters obtained from sniffing the SIP messages, i.e., the connection field and media field of the SIP INVITE and SIP 200 OK messages.

Figure 5:
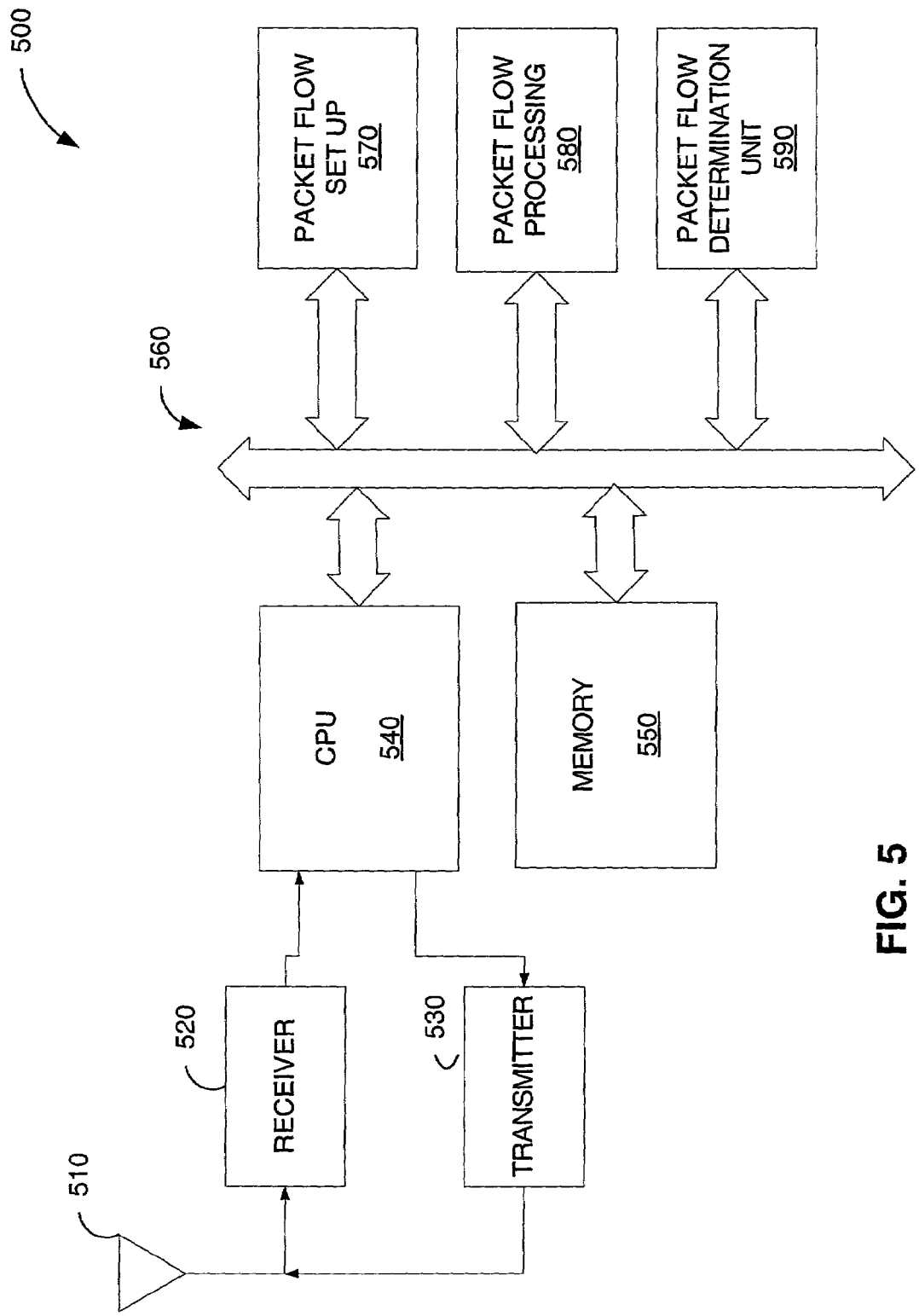
FIG. 5 is a mobile station adapted to process packet flows.

FIG. 5 illustrates a MS 500 adapted for processing packet flows. The MS 500 includes an antenna 510, a receiver 520 and a transmitter 530. The receiver 520 and the transmitter 530 are each coupled to a Central Processing Unit (CPU) 540. The CPU 540 and a memory 550 are each coupled to a communication bus 560. Additionally, a packet flow set up unit 570, a packet flow processing unit 580, and a packet flow determination unit 590 are each coupled to the communication bus 560. The packet flow determination unit 590 determines the whether the communication is bi-directional or uni-directional. The packet flow set up unit 570 determines the specifics of the packet flow, such as codec type, header compression. The packet flow set up unit 570 and the packet flow determination unit 590 are involved in the initial access and set up for the transmission of the packet flow, such as illustrated in FIGS. 2 and 3. Once the communication is established, the packet flow processing unit 580 processes the packet flow according to the specific parameters established.

The present invention provides a flexible method for communicating packet flow parameters in RSVP messages without depending on Differentiated Service Code Point (DSCP) which is conveyed in a field of the IP header, protocol types, and well-known port numbers. The use of a message such as the RSVP message may be used for both bi-directional and un-idirectional packet flows.

The use of existing messages to provide the packet flow information accomplishes an efficient air-resource allocation and use criteria. In one embodiment, the new bearer connection for the communication, i.e., new A10 connection, is not established until the RSVP reservation is authorized. This avoids requiring termination of the bearer connection (i.e., auxiliary SO, A8/A10 connections) on refusal.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for establishing a communication session of data flow with a corresponding node through an intermediary, comprising:
   exchanging a session initiation message with said corresponding node;
   receiving a first reservation message having information of said corresponding node via said intermediary; and
   sending a second reservation message to said intermediary, said second reservation message includes parameters for establishing said data flow particular to said communication session to said corresponding node.

2. The method of claim 1 further including providing in said second reservation message parameters for the flow specification, filter specification, and treatment specification of said communication session.

3. The method of claim 2 further including providing in said second reservation message parameters selected from a group consisting of header compression information, codec information, resource reservation protocol information, and quality of service information of said data flow of said communication session.

4. An apparatus for establishing a communication session of data flow with a corresponding node through an intermediary, comprising:
   means for exchanging a session initiation message with said corresponding node;
   means for receiving a first reservation message having information of said corresponding node via said intermediary; and
   means for sending a second reservation message to said intermediary, said second reservation message includes parameters for establishing said data flow particular to said communication session.

5. The apparatus of claim 4 further including means for providing in said second reservation message parameters for the flow specification, filter specification, and treatment specification of said communication session.

6. The apparatus of claim 5 further including means for providing in said second reservation message parameters selected from a group consisting of header compression information, codec information, resource reservation protocol information, and quality of service information of said data flow of said communication session.

7. An apparatus for establishing a communication session of data flow with a corresponding node through an intermediary, comprising:

a control process for processing said data flow; and a packet flow determination unit coupled to said control processor for exchanging a session initiation message with said corresponding node; receiving a first reservation message having information of said corresponding node via said intermediary; and sending a second reservation message to said intermediary, said second reservation message includes parameters for establishing said data flow particular to said communication session to said corresponding node.

8. A computer-readable medium embodying a method for establishing a communication session of data flow with a corresponding node through an intermediary, comprising computer-readable instructions for exchanging a session initiation message with said corresponding node;

receiving a first reservation message having information of said corresponding node via said intermediary; and sending a second reservation message to said intermediary, said second reservation message includes parameters for establishing said data flow particular to said communication session to said corresponding node.

* * * * *